Sept. 8, 1959 J. E. SCANLAND 2,903,212
SUPPORTING STAND
Filed Feb. 4, 1957 2 Sheets-Sheet 2
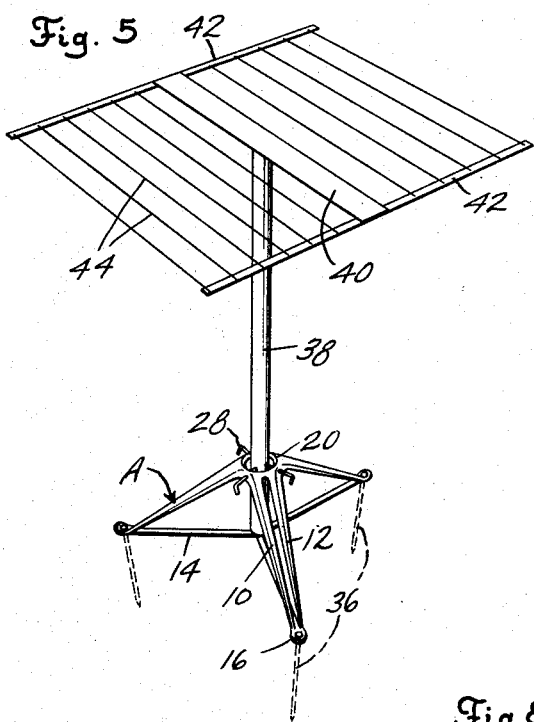
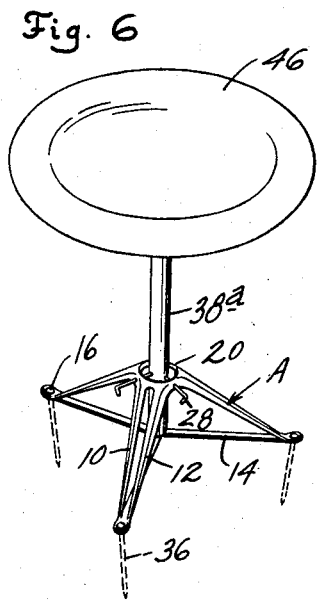
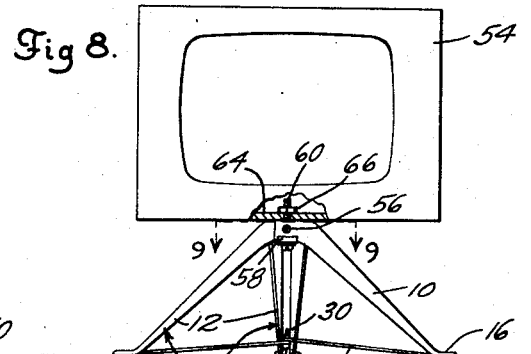
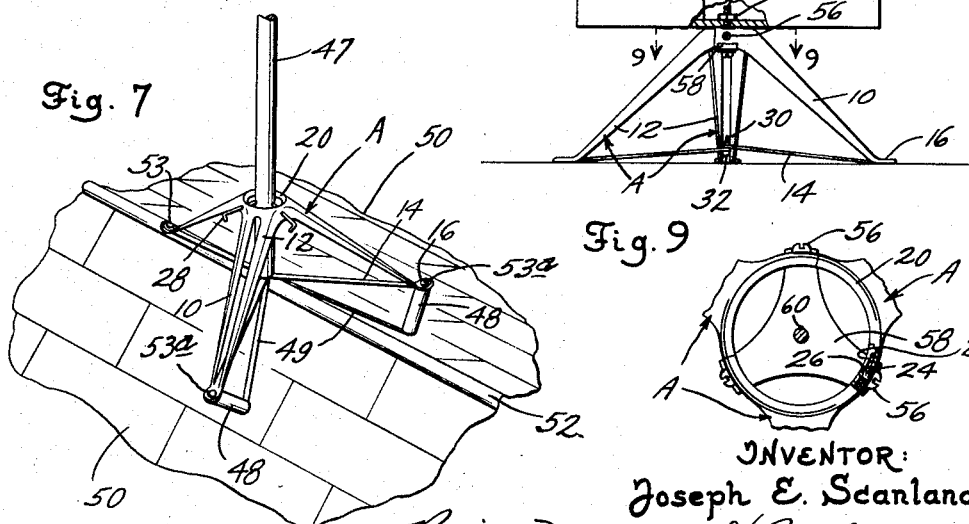
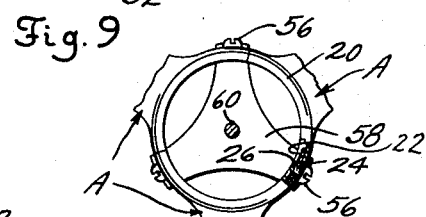
INVENTOR:
Joseph E. Scanland
By Bair, Freeman & Molinare
Attorneys United States Patent Office 2,903,212
Patented Sept. 8, 1959

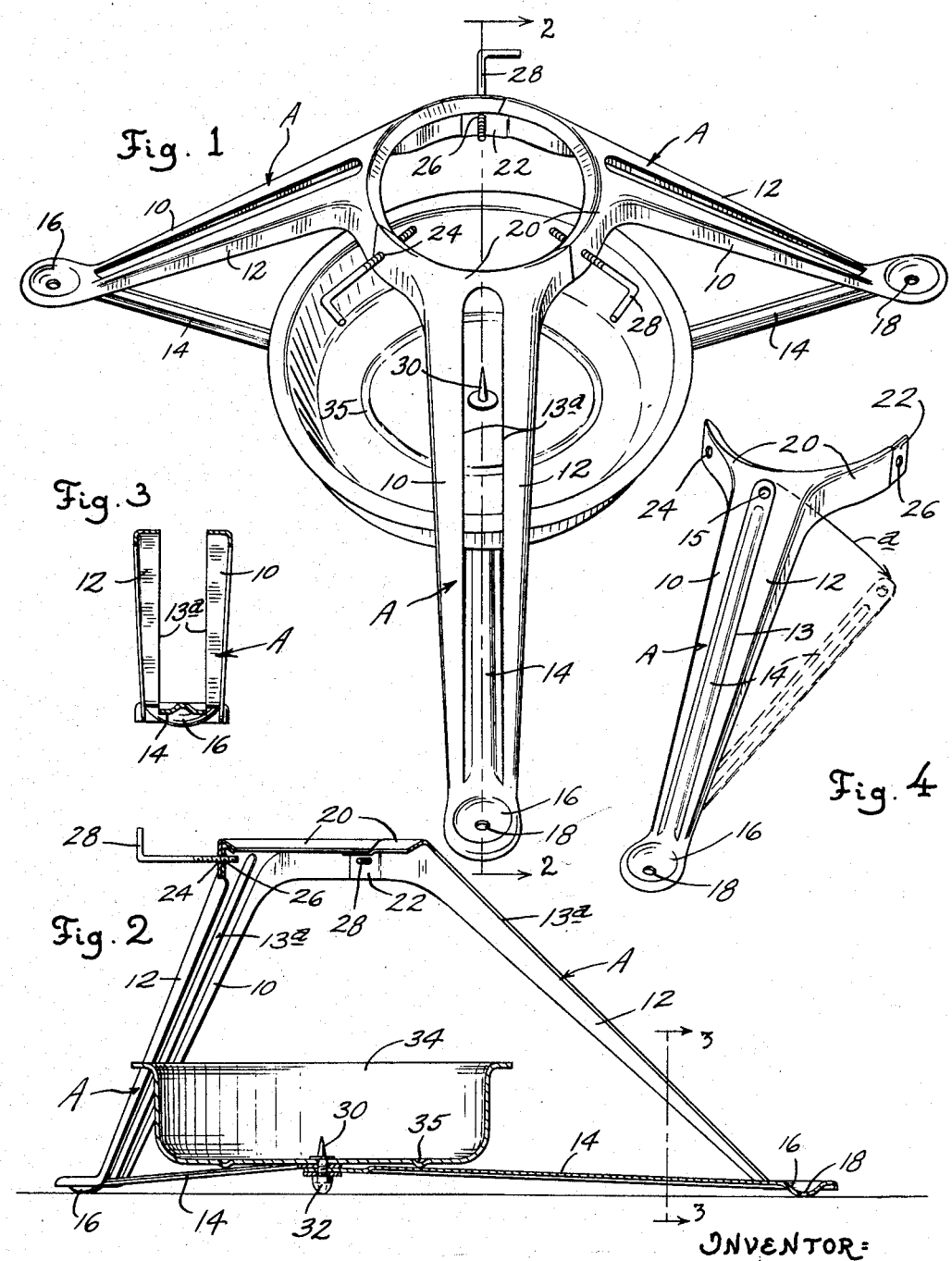

2,903,212

SUPPORTING STAND

Joseph E. Scanland, Des Moines, Iowa, assignor to New Monarch Machine and Stamping Company, Des Moines, Iowa, a corporation of Iowa Application February 4, 1957, Serial No. 638,064

4 Claims. (Cl. 248—48)

This invention relates to a supporting stand of the general type shown in my copending application, Serial No. 411,694, filed February 23, 1954 now Patent No. 2,815,908, dated Dec. 10, 1957.

One object of my present invention is to provide a supporting stand which may be used either as a Christmas tree holder of the general type shown in my copending application or for supporting other structures such as clothes lines, bird baths, television masts, television sets, and the like.

Another object is to provide a comparatively simple and inexpensive supporting stand composed of three similar leg units which may be formed of relatively thin sheet metal and which are so designed as to be connected together to provide a supporting ring at the top, three legs diverging downwardly therefrom and link connections between the legs. The links, when connected together, prevent the legs from spreading and thus produce a relatively rigid tripod structure for the support of a variety of objects, even heavy ones weighing as much as between one and two hundred pounds.

Still another object is to provide a unitary leg and brace structure so designed that a portion sheared from the leg may constitute a brace, or the connecting link above referred to, which even though of relatively thin sheet metal serves to rigidify the three legs of the supporting stand to a great degree without the necessity of providing any elements other than the three leg units themselves to form the entire supporting stand.

A further object is to provide the leg units so designed that they include interconnecting link members, yet the three leg members as initially formed in a punch press may be nested together so that they can fit in a relatively small box such as one measuring about 2" x 3½" x 10" for a leg unit that has over-all dimensions of approximately 1½" x 3½" x 10".

Still a further object is to form the sheet metal leg unit into a leg, a T-shaped head and a link member with suitable angle-shaped, channel-shaped and ribbed cross sections for reinforcing purposes, and which cross sectional shapes also contribute to relatively compact nesting of the leg units together when boxed so that the dealer can carry a large supply of the supporting stands in a small space. This likewise facilitates shipping and contributes to minimizing the cost of the supporting stand so that supporting stands of the character herein disclosed may be sold for under $1.00, and if used for the supporting of a Christmas tree is expendable after use without involving great expense.

With these and other objects in view, my invention consists in the construction, arrangement and combination of the various parts of my supporting stand, whereby the objects above contemplated are attained, as hereinafter more fully set forth, pointed out in my claims and illustrated in detail on the accompanying drawing, wherein:

Fig. 1 is a perspective view of my supporting stand showing a pan used in connection therewith for holding water when the stand is used as a Christmas tree holder, or sand or the like if ballast is desired;

Fig. 2 is a vertical sectional view on the line 2—2 of Fig. 1;

Fig. 3 is an enlarged vertical sectional view on line 3—3 of Fig. 2;

Fig. 4 is a perspective view of one of the leg units, three of which are provided to form a complete stand if the pan of Fig. 1 is not used;

Fig. 5 is a perspective view of the supporting stand used for supporting a clothes drying rack;

Fig. 6 is a perspective view thereof when used as a means for supporting a bird bath;

Fig. 7 is a similar view showing the stand used for supporting a television antenna mast;

Fig. 8 is a front elevation of a television set supported on one of my supporting stands with a few modifications for adapting it particularly thereto; and Fig. 9 is an enlarged horizontal sectional view on the line 9—9 of Fig. 8 showing details.

On the accompanying drawings I have used the reference character A to indicate a leg unit, three of which are assembled together in Fig. 1 to form my supporting stand. Each leg unit comprises leg portions 10 and 12 from which a connecting link 14 is sheared, the line of shearing being indicated at 13 in Fig. 4 and being elongated U-shape. The connecting link 14, prior to assembly as in Fig. 1, is bent downwardly as indicated by the arrow $a$ in Fig. 4 leaving the elongated U-shaped slot 13$a$ (Figs. 1 and 3) in the leg 10—12 when the stand is set up.

Each leg unit A further includes a dished foot 16 perforated at 18 for anchorage stakes or the like as will hereinafter appear and is T-shaped, consisting of the leg 10—12 and a T-head 20. As shown in Fig. 3, the leg portions 10 and 12 are angle shaped by forming the leg channel-shaped as in Fig. 4 so that when the link member 14 is bent out of the slot 13$a$ each of the leg portions 10 and 12 will be angle shaped as shown in Fig. 3. The link member 14 itself has a central bead for reinforcement as shown in cross section in Fig. 3 and the head 20 is acute angle shaped in cross section as shown in Fig. 2, having a reduced portion 22 at one end thereof as shown particularly in Fig. 4. When the three leg units are assembled so that their T-shaped heads 20 form a ring as shown in Fig. 1, each reduced portion 22 is telescoped into the opposite end of the head 20 of the next leg unit. Such opposite end is perforated as indicated at 24 while the reduced end 22 is perforated as indicated at 26. The nature of the perforation at 26 is such that a threaded set screw 28, when threaded thereinto, will form its own thread and as shown at the left side of Fig. 2 the set screw 28 passes freely through the opening 24 and threads into the opening 26 so that it may be forcibly engaged with a tree trunk passing up through the three heads 20 which form the ring. This type of assembly with the three set screws is similar to the construction shown and claimed in my patent hereinbefore referred to.

The inner ends of the three link members 14 are perforated as shown at 15 in Fig. 4 and a special pointed-head bolt 30 passes through the perforations (and also through a central perforation of a water pan 34 as shown in Figs. 1 and 2 if desirable in which case the bolt 30 is soldered to the pan 34 to prevent leakage at this point). When the pan is omitted, the pointed head of the bolt still serves to locate the lower end of a tree trunk, mast or the like in respect to the link members 14. The pan 34 preferably has a circular rib 35 for firm, rigid seating of the pan on the links 14.

When the three leg units are assembled as described, I find that even though the units are formed of relatively thin sheet metal, my stand will support the weight of a man as the weight tends to spread the legs 10—12 but the link members 14 prevent such spreading. Since the link members are in tension, they have considerable strength and effectively prevent undesirable bending of the legs under load.

My supporting stand is adaptable to support a great variety of objects such as a clothes drying rack as shown in Fig. 5 consisting of an upright post 38 with a cross head 40 and arms 42. Clothes line wire 44 is connected between the arms 42, thus providing a rack that may be used in the house if desired or outdoors. When used outdoors it may be set on the ground and headed stakes 36 driven through the perforations 18 of the feet 16 and into the ground for effectively anchoring the rack against falling over.

A similar arrangement is shown in Fig. 6 where the supporting post 38a terminates in a shallow pan-like structure 46 serving as a bird bath. The pan 46 may be made of sheet metal or concrete if desired and again the stakes 36 may be used for anchoring the bird bath against falling over.

In Fig. 7 I show an adaptation for supporting a television antenna mast 47 on a roof 50. One of the legs A may extend along the ridge 52 and may be secured by a nail or screw 53 while the other two legs may be secured by elongated nails or screws 53a with spacers 48 extending down to the roof surface. Links 49 may be provided if desired to further reinforce the entire supporting structure.

Fig. 8 illustrates how my supporting stand may be adapted for supporting a television set. In this instance, instead of the set screws 28 which are used for Christmas tree trunks and the posts or masts 38, 38a and 47 as disclosed in connection with Figs. 5, 6 and 7, ordinary screws 56 may be used, as shown in Fig. 9. These extend through the outer openings 24 and thread into the inner openings 26 to form the three leg heads 20 into a ring as shown in plan view in Fig. 9, and a sheet metal spider 58 may engage the bottom of the ring for the purpose of connection to the bottom 64 of the television set 54 by means of a bolt 60 and a nut 66. In this instance, the pan 34 of Fig. 2 is omitted and merely the bolt 30 and the nut 32 used which likewise is the arrangement that would be used in connection with Figs. 5, 6 and 7 as the pan 34 is not then needed. The point on the screw 30 would enter the bottom of the element 38, 38a, or 47 as the case may be whereas an ordinary bolt may be used in connection with Fig. 8 if desired instead of the pointed type 30.

From the foregoing specification it will be obvious that I have provided a supporting stand consisting of three leg units which have integrally formed with them a link connecting means for the units when they are assembled into a supporting structure. Obviously, the device may be made relatively inexpensive when made of thin sheet metal and because it requires but a single stamping to form the leg unit whereupon three of them are then provided to form the complete supporting structure and can be packed compactly in a box of small dimensions. The pans 34 can be boxed and sold separately as some users would want the pan and some would not.

Some changes may be made in the construction and arrangement of the parts of my supporting stand without departing from the real spirit and purpose of my invention, and it is my intention to cover by my claims any modified forms of structure or use of mechanical equivalents which may reasonably be included within their scope.

I claim as my invention:

1. In a supporting stand of the character disclosed, a plurality of T-shaped leg members formed of sheet metal, each of said leg members comprising a pair of leg portions spaced from each other and each of which is substantially L-shaped in cross section, said pair of leg portions terminating in a single foot at their lower ends and in an integral arc-shaped portion at their upper ends of greater horizontal length than the width of said leg member, means connecting the ends of said arc-shaped portions together in overlapping relationship, said means being adapted for reacting against an article supported within said arc-shaped portion to provide a rigid ring-shaped top for said stand, and means connecting said leg members together against spreading comprising a link integral with each leg member adjacent the foot thereof, said links extending toward each other and being perforated adjacent their inner ends, and a fastening element passing through the perforations of all of said links.

2. In a supporting stand, a plurality of T-shaped leg members each having a pair of arms and a double leg terminating in a single foot, the ends of said arms overlapping and connected together by means of elements extending therethrough to provide a rigid ring-shaped top for said stand, a link for each leg member and having one end integrally connected thereto adjacent said foot thereof, and a fastening element connecting the other ends of said links together whereby they retain said legs against spreading.

3. A supporting stand of the character disclosed comprising a plurality of identical upwardly converging leg members, each of said leg members comprising a dual leg portion terminating in a single foot at its lower end and in an arcuate head portion at its upper end arranged transversely of, and having a horizontal length greater than the width of said leg portion, means for connecting the ends of said arcuate head portions together in overlapping relationship to form a complete supporting ring, and means securing said leg portions adjacent their lower ends to each other comprising a link element extending from adjacent foot of each leg element, and means connecting the inner ends of said links together in overlapping relationship.

4. A supporting stand comprising a plurality of similar T-shaped leg members each comprising a foot and a dual leg portion terminating in an arcuate portion at its upper end which in cross section has a substantially vertical flange and a substantially horizontal flange, the flanges of said arcuate portions interfitting in overlapping relation and being connected with each other to form a rigid supporting ring, and means adjacent the lower ends of said leg portions for tying them together, said last means being integral with said leg portions and comprising a link for each leg member extending therefrom adjacent said foot, the opposite ends of said links being perforated and arranged to overlap each other, and a fastening element therethrough.

References Cited in the file of this patent

UNITED STATES PATENTS

| 1,110,142 | Piner | Sept. 8, 1914 |
| 1,288,551 | Foster | Dec. 24, 1918 |
| 1,912,054 | Wright | May 30, 1933 |
| 2,119,342 | Morris | May 31, 1938 |
| 2,561,693 | Frye | July 24, 1951 |
| 2,699,308 | Shackelford | Jan. 11, 1955 |